United States Patent Office 2,753,250
Patented July 3, 1956

2,753,250

SOLVENT EXTRACTION OF ZIRCONIUM VALUES

Harley A. Wilhelm, Ames, Iowa, Kenneth A. Walsh, Los Alamos, N. Mex., and James V. Kerrigan, Chicago, Ill., assignors to the United States of America as represented by the United States Atomic Energy Commission No Drawing. Application August 18, 1953,
Serial No. 382,496

12 Claims. (Cl. 23—312)

The process of this invention deals with the recovery of zirconium values and/or hafnium values from aqueous solutions by solvent extraction, and in particular with the separation of zirconium values from hafnium values associated therewith.

Most zirconium ores contain hafnium which is difficult to separate from the zirconium because of the similar chemical properties of these two elements. Consequently, technical grade zirconium salts are usually contaminated by hafnium salts; in particular is this true for the zirconyl chloride and zirconyl nitrate, the salts obtained in the methods mostly used for the processing of zirconium ores.

For a great many uses of zirconium salt, e. g. for the metal production, a high degree of purity is required; high-purity hafnium products are also of great interest. It was therefore desirable to devise a process by which the zirconium and hafnium can be readily and efficiently separated from each other.

Hafnium and zirconium salts have been separated and recovered by extraction with water-immiscible alkyl phosphates. A nitric acid aqueous solution of these salts has been employed which contains calcium nitrate as a salting-out agent. While the process operates satisfactorily and brings about a good separation, it was found that either a satisfactory decontamination but a relatively low zirconium extraction was accomplished, or else a high zirconium yield with a relatively high hafnium content was obtained, depending on the conditions used. It has not been possible heretofore to obtain low hafnium-content zirconium and high yields of such pure zirconium in the same solvent extraction run. On the other hand, an all-chloride, nitric acid-free system which contained free hydrochloric acid and calcium chloride as the salting-out agent was found to yield an extremely low total extraction.

It is an object of this invention to provide a solvent extraction process for the recovery of zirconium values from aqueous solutions containing said zirconium values and hafnium values by which a high decontamination of the zirconium from the hafnium is accomplished.

It is another object of this invention to provide a solvent extraction process for the recovery of zirconium values from aqueous solutions containing also hafnium values by which a high degree of total extraction of the zirconium is obtained and at the same time very little hafnium is coextracted.

It is still another object of this invention to provide a solvent extraction process for the recovery of pure hafnium salts from aqueous solutions containing a mixture of zirconium and hafnium salts.

It has been found that an improved extraction of zirconium with a very low hafnium content is obtained if the extraction is carried out with alkyl phosphate in the presence of both chloride and nitrate anions.

The process of separating zirconium values from hafnium values by contact of an aqueous liquid with a substantially water-immiscible organic liquid, one of said liquids containing said values in the form of a salt mixture, according to this invention thus comprises securing the simultaneous presence of chloride anions and nitric acid in said aqueous liquid; contacting said aqueous liquid with the substantially water-immiscible solvent whereby the zirconium values are preferentially taken up by an organic extract phase while the hafnium values are preferentially held in said aqueous liquid, said solvent being selected from the group consisting of alkyl phosphate, aryl phosphate, and a mixture of alkyl phosphate and aryl phosphate; and separating said extract phase from said aqueous liquid.

In most instances the zirconium and hafnium values are contained in an aqueous solution which may already contain free nitric acid and chloride anions. If not present, the chloride anion may be added in the form of any water-soluble compound, such as hydrochloric acid or a water-soluble chloride. Calcium chloride is the preferred compound because, as will be explained later, it at the same time acts as a salting-out agent. While the process is applicable to the separation of zirconium and hafnium values contained in organic phosphate solutions as well as to their separation from aqueous media, the process will now be described in detail as directed to the extraction from aqueous solutions by the organic solvent.

Various zirconium salts may be dissolved for preparing the feed solution to be treated by the extraction process. If zirconium tetrachloride is chosen, hydrolysis takes place in the water and, due to the exothermic character of the dissolution and hydrolysis reactions, the temperature increases so that the hydrochloric acid formed by the hydrolysis distills off; this, of course, represents an undesirable loss in material. However, it was found that volatilization of hydrochloric acid can be prevented by introducing water into the container before adding the zirconium tetrachloride in solid form. Part, or all, of the hydrochloric acid formed may then be neutralized by incorporating lime into the solution whereby calcium chloride, the preferred salting-out agent, is formed. Instead of zirconium tetrachloride, zirconium oxychloride, which is obtained in a great many zirconium ore processing methods, may be used as the starting material.

The effect of the concentration of free acid on the results of the extraction process was studied. It was found that the nitric acid concentration may vary widely and still bring about satisfactory results; however, a concentration between 2.5 and 5 M was found best. The free nitric acid, and any hydrochloric acid that might be present, function as salting-out agents. However, it was found beneficial to have a salt present in addition to the free acid or acids. While all water-soluble nitrates or chlorides are suitable for this purpose, chlorides are preferred because they furnish at the same time the chloride anion necessary to bring about the improvement of the process of this invention. As has been mentioned before, calcium chloride is the most satisfactory salting-out agent. The concentration of the salting-out salt may vary widely; for calcium chloride a concentration between 1 and 2 M was preferred, the best results, though, being obtained with a concentartion between 1.5 and 1.65 M.

Tributyl phosphate was the preferred organic phosphate solvent for the extraction; however, other substantially water-immiscible alkyl phosphates and aryl phosphates are suitable. The mixture of various of said phosphates is also satisfactory. Such other phosphates, for instance, are tricresyl phosphate, trihexyl phosphate, trioctyl phosphate, octadecyl hydrogen phosphate, dioctyl phenyl phosphonate, didecyl phenyl phosphonate, and dihexyl phenyl phosphonate.

Some of the alkyl phosphates have a high viscosity and a high specific gravity which make separation of the aqueous phase from the solvent phase difficult. In such cases, it has been found advantageous to dilute the solvent with a less viscous organic liquid so that separation of the phases is facilitated. For instance, tributyl phosphate is preferably used in diluted form. The diluents should preferably have a specific gravity of less than 1; suitable diluents for use with alkyl phosphates are: diethyl ether; diisopropyl ether; dibutyl ether; hydrocarbons, such as hexane, n-heptane, n-octane, the n-alkanes with twelve, thirteen or fourteen carbon atoms, and methyl-cyclohexane; carbon tetrachloride has also given good results. Another diluent, which has been successfully used, is a naphtha having a specific gravity of 0.75, a boiling point of 167°–180° F. and a flash point of 120° F. It is sold under the trade name "Varsol." A mixture of any of the diluents enumerated above may also be used. The preferred mixture for the process of this invention was one containing 60% by volume of tributyl phosphate and 40% of dibutyl ether.

In order to maintain a practically constant concentration of acids and salting-out agent during the extraction step, it is advisable to saturate the organic solvents with the salting-out salts and acids prior to their use. This "equilibration" of the solvent was carried out, for instance, by contacting the solvent with an approximately equal volume of aqueous solution which contained the same salts and acids, except the zirconium and hafnium salts, in about the same concentrations as the feed solution. The aqueous solution remaining after equilibration was then used as scrub solution, as will be described later.

The solvent is reusable for a great many times; five extractions with the same solvent did not show that the efficiency of the extraction had been impaired. However, from time to time a regeneration of the solvent became necessary. This could be done by washing the solvent with caustic soda; however, the phase separation was rather slow in this instance. Sodium carbonate solution was found to be better in this respect. A faster and more efficient method was devised; it comprised two contacts with 7 N sulfuric acid, each using the same volume as that of the solvent to be treated, thereafter two water washes (also each of equal volume), then three contacts with 1.5 M sodium hydroxide, each contact using ⅓ of the volume of that of the solvent, and finally four washes with water (each of equal volume). Instead of regenerating the entire quantity of solvent after a certain number of extractions, it was found advantageous continuously to withdraw small fractions of the solvent for regeneration.

After the contact of the aqueous solution with the solvent, the organic phase obtained is washed or "scrubbed" with an aqueous medium, the scrub solution, for the removal of any hafnium which might have been coextracted with the zirconium. This scrub solution suitably has a composition similar to that of the aqueous starting or feed solution as to acid and salting-out salt. The aqueous solution remaining after the equilibration of the solvent, as has been described above, is well suited for use as a scrub solution.

The organic extract phase obtained, after separation from the aqueous raffinate, is then treated for the recovery of the enriched or purified zirconium. This may be done by back-extraction or "stripping," which is by contacting the organic solution with an aqueous medium that has a higher affinity for the zirconium than has the solvent. Water has this property, and it is therefore an ideal agent for this purpose. But sometimes the density of the organic phase is so close to that of water that hydrochloric acid or sulfuric acid are preferred for stripping. For instance, 7 N sulfuric acid and 3.5 N hydrochloric acid have been satisfactorily used for this purpose, the sulfuric acid being the most effective stripping medium of the three liquids here discussed. It is advisable to carry out stripping from the solvent phase while it is still fresh; aged solvent solutions do not give as high yields as the fresh ones. The aqueous solutions obtained after stripping contained a mixture of zirconyl chloride and zirconyl nitrate.

The aqueous waste solution or raffinate obtained in the extraction step can be freed from any small amount of non-extracted zirconium by applying the process of this invention to this raffinate; a solution containing pure hafnium salt is produced thereby.

Well known extraction procedures may be used in carrying out the process of this invention. Thus, the extraction steps may be effected by the use of batch, continuous batch, batch countercurrent or continuous countercurrent methods. An especially efficient extraction is obtained by the use of the continuous countercurrent method. In all cases, the ratio of liquid organic solvent to initial aqueous solution may vary widely, e. g. from 1:10 to 10:1, and the optimum ratio will depend upon the particular organic solvent and the concentrations used. For the extraction step a flow rate of 1:1:1 for feed, scrub and solvent, respectively, has been found best; for the stripping step a flow rate from 0.8 to 1 has been preferred for the aqueous medium and extract phase, respectively. The organic solvent may be either the dispersed phase or the continuous phase; however, the former is the preferred type.

The process of this invention may be carried out in any of the devices used for extraction. The device known as mixer-settler extractor, however, was preferred. In the apparatus used, each unit consisted of a mixer tube 14 inches high and 2 inches in diameter and of a settler tube of the same dimensions. The two tubes were made of glass and were rigidly interconnected at about the middle of their height by a glass cross tube. Individual stirrer motors were used for each mixer, and the stirrers were also made of glass. All stages were separated on the same level. Countercurrent flow was used in the extractor units and in the assembly composed of the various units.

In the following, two examples are given to illustrate the efficiency of the process of this invention without the intention to have the invention limited to the details given therein.

*Example I*

A number of single-contact batch extraction tests were carried out using an aqueous solution 5 M in $HNO_3$, 1.5 M in $CaCl_2$, 0.5 and 0.3 M in $ZrOCl_2$, respectively, and having varying hydrochloric acid contents ranging from 0 to 1.5 M. The solvent consisted of 60% by volume of tributyl phosphate and 40% by volume of butyl ether as diluent. Equal volumes of the aqueous solution and the solvent were contacted. The results are compiled in the table below.

| Initial Composition of Aqueous Solution: 5.0 M in $HNO_3$, 1.5 M in $CaCl_2$ and— | | Distribution Coefficient (organic/aqueous) for— | | Separation Factor $\left(\dfrac{\text{Distr. Coeff. Zr}}{\text{Distr. Coeff. Hf}}\right)$ |
|---|---|---|---|---|
| HCl, M | $ZrOCl_2$, M | Zr | Hf | |
| ------- | 0.5 | 2.90 | 0.095 | 30.4 |
| ------- | 0.3 | 6.98 | 0.280 | 25.0 |
| 0.5 | 0.5 | 7.20 | 0.180 | 40.0 |
| 0.5 | 0.3 | 10.9 | 0.270 | 40.4 |
| 1.0 | 0.5 | 18.2 | 0.510 | 36.0 |
| 1.0 | 0.3 | 33.0 | 0.820 | 40.3 |
| 1.5 | 0.5 | 39.0 | 1.45 | 26.9 |
| 1.5 | 0.3 | 52.5 | 1.95 | 27.0 |

These experiments show that the zirconium extraction is substantially improved by the presence of HCl in the nitric acid feed and that the separation factor is also slightly higher under these conditions.

*Example II*

An aqueous solution 2.88 M in nitric acid, 0.60 M in hydrochloric acid, 1.64 M in calcium chloride, 0.55 M in zirconyl chloride and 0.006 M in hafnyl chloride was treated by the process of this invention. The zirconium contained 135 parts of titanium per million parts of zirconium. A solvent was used containing a mixture of 60% by volume of tributyl phosphate and 40% by volume of dibutyl ether and being 2.13 M in nitric acid. The scrub solution employed was 1.74 M in calcium chloride, 2.60 M in nitric acid and 0.70 M in hydrochloric acid. The three liquids were introduced into the mixer-settler extractors at the same flow rate, namely, of 0.645 gals./hr. A seven-stage extraction was again employed and the feed was introduced to the fourth stage. The aqueous raffinate obtained was $3.7 \times 10^{-3}$ M in hafnium, $2.5 \times 10^{-4}$ M in zirconium, 2.13 M in nitric acid, 1.2 M in hydrochloric acid and 1.65 M in calcium chloride. The extract phase was 0.40 M in zirconium and 2.32 M in nitric acid.

The separated extract phase was then introduced into a 15-foot high, packed stripping column, at its bottom, at a flow rate of 1.05 gals./hr. Distilled water, as the stripping medium, was flowed into the top of the column at a rate of 1.94 gals./hr. The stripped solvent leaving the column was $5 \times 10^{-3}$ M in zirconium and 0.11 M in nitric acid; the aqueous product contained zirconium in a concentration of 0.162 M and was 0.96 M in nitric acid. The aqueous raffinate obtained in the extraction units container a 96%-pure hafnium product; the zirconium of the aqueous product solution resulting in the stripping column contained only 170 parts of hafnium per million parts of zirconium. The zirconium recovery was 99%.

The zirconium of the aqueous product solution from the stripping column contained only 16 parts of titanium per million parts of zirconium. This shows that the process also accomplishes a good separation of zirconium from titanium.

It will be understood that this invention is not to be limited to the details given herein but that it may be modified within the scope of the appended claims.

What is claimed is:

1. A process of separating zirconium values from hafnium values by contact of an aqueous liquid with a substantially water-immiscible organic liquid, one of said liquids containing said values in the form of a salt mixture, comprising securing the simultaneous presence of chloride anions and nitric acid in said aqueous liquid; contacting said aqueous liquid with the substantially water-immiscible solvent whereby the zirconium values are preferentially taken up by an organic extract phase while the hafnium values are preferentially held in said aqueous solution, said solvent being selected from the group consisting of alkyl phosphate, aryl phosphate, and a mixture of alkyl phosphate and aryl phosphate; and separating said extract phase from said aqueous solution.

2. A process of separating zirconium values from hafnium values contained in an aqueous acid solution containing chloride and nitrate anions, comprising contacting said solution with alkyl phosphate whereby the zirconium values are preferentially taken up by an organic extract phase while the hafnium values preferentially remain in said aqueous solution, and separating said extract phase from said aqueous solution.

3. The process of claim 2 wherein the alkyl phosphate is tributyl phosphate.

4. The process of claim 3 wherein the tributyl phosphate is mixed with a diluent.

5. The process of claim 4 wherein the diluent is dibutyl ether.

6. The process of claim 2 wherein the chloride is present in the form of calcium chloride.

7. The process of claim 6 wherein calcium chloride is present in a concentration of from 1 to 2 M and nitrate anions are present in the form of from 2.5 to 5 M nitric acid.

8. A process of separating zirconium values from hafnium values admixed in an aqueous acid solution containing chloride and nitrate anions, comprising contacting said solution with alkyl phosphate whereby the zirconium values are preferentially taken up by an organic extract phase while the hafnium values preferentially remain in said aqueous solution, separating said extract phase from said aqueous solution, contacting said extract phase with an aqueous medium whereby said zirconium values are taken up by said medium, and separating said zirconium-containing aqueous medium from said extract phase.

9. The process of claim 8 wherein the aqueous medium is water.

10. The process of claim 8 wherein the aqueous medium is sulfuric acid.

11. The process of claim 8 wherein the aqueous medium is hydrochloric acid.

12. A process of separating zirconium values from hafnium values contained in an aqueous solution comprising adding nitric acid to said solution in a quantity so as to obtain a concentration of from 2.5 to 5 M; adding calcium chloride in a quantity to obtain a concentration of about 1.5 M; contacting the aqueous solution with a mixture of 60% by volume of tributyl phosphate and 40% by volume of dibutyl ether; separating an extract zirconium-containing tributyl phosphate phase from said aqueous solution containing said hafnium values; contacting said tributyl phosphate phase with water whereby the zirconium values are transferred from said tributyl phosphate phase into the water; and separating said zirconium-containing water from said tributyl phosphate phase.

No references cited.